United States Patent
Li et al.

(10) Patent No.: US 9,258,455 B2
(45) Date of Patent: Feb. 9, 2016

(54) MECHANISM FOR K-ONLY OBJECT RENDERING IN A HIGH-SPEED COLOR CONTROLLER

(75) Inventors: Hong Li, Superior, CO (US); Edward F. Chatcavage, Longmont, CO (US); Jean M. Aschenbrenner, Boulder, CO (US); Larry D. Teklits, Loveland, CO (US); Larry M. Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 1110 days.

(21) Appl. No.: 12/151,803

(22) Filed: May 8, 2008

(65) Prior Publication Data

US 2009/0279142 A1    Nov. 12, 2009

(51) Int. Cl.
- G06F 3/12 (2006.01)
- H04N 1/40 (2006.01)

(52) U.S. Cl.
CPC .......... *H04N 1/40012* (2013.01); *G06F 3/1297* (2013.01)

(58) Field of Classification Search
CPC .................. G06F 3/1297; H04N 1/40012
USPC .......... 358/1.6, 1.9, 2.1, 2.99, 3.01, 462, 515, 358/518, 529, 534, 540; 347/131, 232, 240
See application file for complete search history.

(56) References Cited

U.S. PATENT DOCUMENTS

| | | | |
|---|---|---|---|
| 5,745,145 A | | 4/1998 | Hirabayashi et al. |
| 5,751,434 A | * | 5/1998 | Narendranath et al. ....... 358/1.9 |
| 5,884,014 A | * | 3/1999 | Huttenlocher et al. ...... 358/1.15 |
| 5,960,161 A | | 9/1999 | Bloomberg et al. |
| 6,236,752 B1 | * | 5/2001 | Katayama et al. ............ 382/183 |
| 6,775,030 B2 | | 8/2004 | Krabbenhoft et al. |
| 2002/0069778 A1 | * | 6/2002 | Jacobs .......................... 101/484 |
| 2002/0159106 A1 | | 10/2002 | Fuchigami et al. |
| 2002/0191046 A1 | | 12/2002 | Otsuki et al. |
| 2005/0219661 A1 | | 10/2005 | Hirabayashi |
| 2006/0197825 A1 | | 9/2006 | Mohri |

(Continued)

FOREIGN PATENT DOCUMENTS

| | | |
|---|---|---|
| CN | 101576812 | 11/2009 |
| EP | 1021034 | 12/2002 |
| JP | 11-289464 | 10/1999 |

(Continued)

OTHER PUBLICATIONS

JP Application No. 2009-113848 Office Action, Sep. 4, 2012, 8 pages.

(Continued)

*Primary Examiner* — Eric A Rust
(74) *Attorney, Agent, or Firm* — Blakely, Sokoloff, Taylor & Safman LLP

(57) ABSTRACT

Embodiments of the invention disclose a method for K-only (gray/black) object rendering in a high-speed color controller of a printing system. The method includes setting a flag to indicate selection of a K-only text and barcode print preference from a user of a print system, receiving one or more objects to be printed by the print system, the one or more objects including at least one of a text object and a barcode object, determining whether an input color space for the at least one text object and barcode object should be converted to K-only black ink, and rendering the at least one of the text object and the barcode object as K-only black ink if the input color space is determined to be converted to K-only black ink.

20 Claims, 5 Drawing Sheets

(56) References Cited

U.S. PATENT DOCUMENTS

2007/0286617 A1    12/2007  Tanaka et al.
2008/0079977 A1*   4/2008   van de Capelle et al. .... 358/1.13

FOREIGN PATENT DOCUMENTS

| JP | 11289464 | 10/1999 |
| JP | 2000-203096 | 7/2000 |
| JP | 2010015545 | 1/2010 |
| JP | 5276516 | 8/2013 |
| WO | WO-2005/088470 | 9/2005 |

OTHER PUBLICATIONS

JP Application No. 2009-113848, Notice of Allowance, 3 pages.
CN Application No. 200910136468.2, First Office Action, Jul. 19, 2011, 24 pages.
CN Application No. 200910136468.2, Second Office Action, Mar. 23, 2012, 23 pages.
CN Application No. 200910136468.2, Decision of Rejection, Dec. 6, 2012, 24 pages.

* cited by examiner

400

```
/show
{gsave currentcolorspace 0 get dup
 /DeviceRGB eq
 {mark 0.1 currentcolor
  1 1 4 index sub 1 4 index sub div sub abs
  1 1 3 index sub 1 5 index sub div sub abs
  5 index lt exch 5 index lt and
  {0.11 mul 3 1 roll 0.59 mul 3 1 roll 0.3 mul add add 1.0 exch
   sub 0 0 0 4 -1 roll setcmykcolor
  }if
  cleartomark
 }if
 /DeviceCMYK eq
 {mark 0.1 currentcolor dup 1 eq
   {cleartomark 0 0 0 1 setcmykcolor}
   {1 4 index 4 index div sub abs 1 3 index 5 index div sub abs
    6 index lt exch 6 index lt and
    {add add add dup 1 lt
     {0 0 0 4 -1 roll}{0 0 0 1}ifelse setcmykcolor
    }if
    cleartomark
   }ifelse
 }if
 systemdict /show get exec
 grestore
} def
```

Figure 4

MECHANISM FOR K-ONLY OBJECT RENDERING IN A HIGH-SPEED COLOR CONTROLLER

FIELD OF THE INVENTION

This invention relates generally to the field of printing systems. More particularly, the invention relates to K-only (gray/black) object rendering in a high-speed color controller of a printing system.

BACKGROUND

In color printing, it is often desirable to print black text and barcodes using K-only gray/black ink and/or toner (hereinafter "ink") in lieu of the process or rich gray/black ink. K-only ink is associated with the CMYK subtractive color model used in color printing. CMYK stands for Cyan, Magenta, Yellow, and Key. The Key stands for black. The cyan, magenta, and yellow colors in the CMYK model are also known as subtractive primaries. The CMYK model works by partially or entirely masking certain colors on a typically white background (that is, absorbing particular wavelengths of light). CMYK utilizes mixtures of the cyan, magenta, and yellow colors and techniques such as half-toning to create a full spectrum of colors for color printing.

The K, or gray/black, of the CMYK model is used to produce deeper black tones, unsaturated colors, and dark colors by substituting for the combination of the subtractive primary colors. Adding the K ink absorbs more light and yields much "blacker" blacks. K-only gray/black is defined by using only the black (K) in the CMYK model, with no cyan, magenta, or yellow colors.

On the other hand, a process (or rich) gray/black may be produced in the CMYK model by adding K ink along with some mixture of each of the subtractive primary inks. However, this mixing of cyan, magenta, and yellow primary colors is typically unsatisfactory for darker tones because it often results in a muddy dark brown color that does not appear quite black. In addition, a combination of a high percentage of cyan, magenta, and yellow inks soaks the paper with ink, making it slower to dry, sometimes impractically so. Finally, finely detailed printing using the three subtractive primary inks without any slight blurring requires impractically accurate registration (i.e., all three images, or colors, would need to be aligned extremely precisely).

As discussed above, process gray/black uses much more ink compared to K-only gray/black ink. As a result, printing gray or black text and barcodes with K-only ink can save ink usage amounts. In addition, text and barcodes printed with process gray/black ink may have color fringe or bleeding due to registration errors and poor plate alignment, which may cause print quality problems such as barcode readability issues. Utilizing K-only printing of text and barcodes can avoid this color fringe problem. As a result, a solution to enforce K-only gray/black printing of text and barcodes in a color printing system would be beneficial.

SUMMARY

In one embodiment, a method is disclosed. The method includes setting a flag to indicate selection of a K-only text and barcode print preference from a user of a print system, receiving one or more objects to be printed by the print system, the one or more objects including at least one of a text object and a barcode object, determining whether an input color space for the at least one text object and barcode object should be converted to K-only black ink, and rendering the at least one of the text object and the barcode object as K-only black ink if the input color space is determined to be converted to K-only black ink.

In another embodiment, a printing system is disclosed. The printing system includes a print application to provide a graphical user interface (GUI) to a user of a print system in order for the user to select a K-only text and barcode print preference, a print server communicably coupled to the print application to process a print job sent by the user and identify one or more objects in the print job, the one or more objects including at least one of a text object and a barcode object, and a control unit communicably coupled to the print server. In addition, the control unit is to set a flag to indicate the selection of the K-only text and barcode print preference by the user, determine whether an input color space for the at least one text object and barcode object should be converted to K-only black ink, and render the at least one of the text object and the barcode object as K-only black ink if the input color space is determined to be converted to K-only black ink.

BRIEF DESCRIPTION OF THE DRAWINGS

A better understanding of the present invention can be obtained from the following detailed description in conjunction with the following drawings, in which:

FIG. 4 is an code listing for an exemplary redefinition of an operator according to an embodiment of the invention.

DETAILED DESCRIPTION

A mechanism for K-only object rendering in a high-speed color controller of a printing system is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
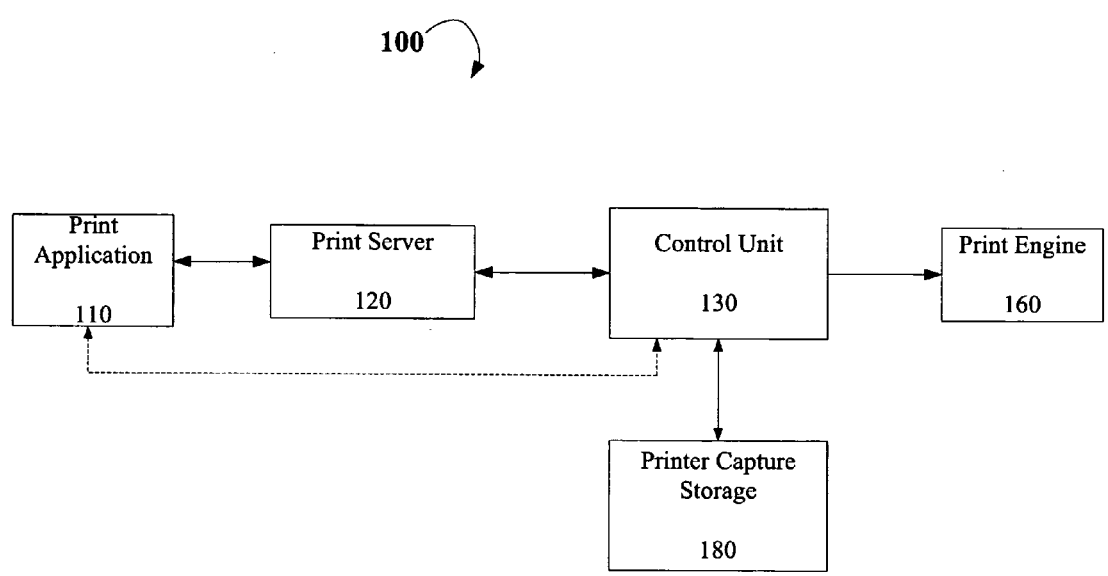
FIG. 1 illustrates one embodiment of a printing system.

FIG. 1 illustrates one embodiment of an Advanced Function Presentation (AFP) printing system 100 utilized in embodiments of the invention. Printing system 100 includes a print application 110, a server 120, a control unit 130 and a print engine 160. Print application 110 makes a request for the printing of a document. In one embodiment, print application 110 provides a Mixed Object Document Content Architecture (MO:DCA) data stream to print server 120.

In other embodiments, print application 110 may also provide PostScript (PS) and PDF files for printing. PS and PDF files are printed by first passing them through a pre-processor (not shown), which creates resource separation and page independence so that the PS or PDF file can be transformed into an AFP MO:DCA data stream prior to being passed to print server 120.

According to one embodiment, the AFP MO:DCA data streams are object-oriented streams including, among other things, data objects, page objects, and resource objects. In a further embodiment, AFP MO:DCA data streams include a Resource Environment Group (REG) that is specified at the beginning of the AFP document, before the first page. When the AFP MO:DCA data streams are processed by print server 120, the REG structure is encountered first and causes the server to download any of the identified resources that are not already present in the printer. This occurs before paper is moved for the first page of the job. When the pages that require the complex resources are eventually processed, no additional download time is incurred for these resources.

Print server 120 processes pages of output that mix all of the elements normally found in presentation documents, e.g., text in typographic fonts, electronic forms, graphics, image, lines, boxes, and barcodes. The AFP MO:DCA data stream is composed of architected, structured fields that describe each of these elements.

In one embodiment, print server 120 communicates with control unit 130 via an Intelligent Printer Data Stream (IPDS). The IPDS data stream is similar to the AFP data steam, but is built specific to the destination printer in order to integrate with each printer's specific capabilities and command set, and to facilitate the interactive dialog between the print server 120 and the printer. The IPDS data stream may be built dynamically at presentation time, e.g., on-the-fly in real time. Thus, the IPDS data stream is provided according to a device-dependent bi-directional command/data stream.

According to one embodiment, control unit 130 process and renders objects received from print server and provides sheet maps for printing to print engine 160. Objects are captured and stored in the printer capture storage 180. In some embodiments, control unit 130 may receive objects to process and render directly from print application 110. In some embodiments, protocols such as Line Printer Remote (LPR) and File Transfer Protocol (FTP) may be used for sending print data to the control unit 130 directly from print application 110.

Figure 2:
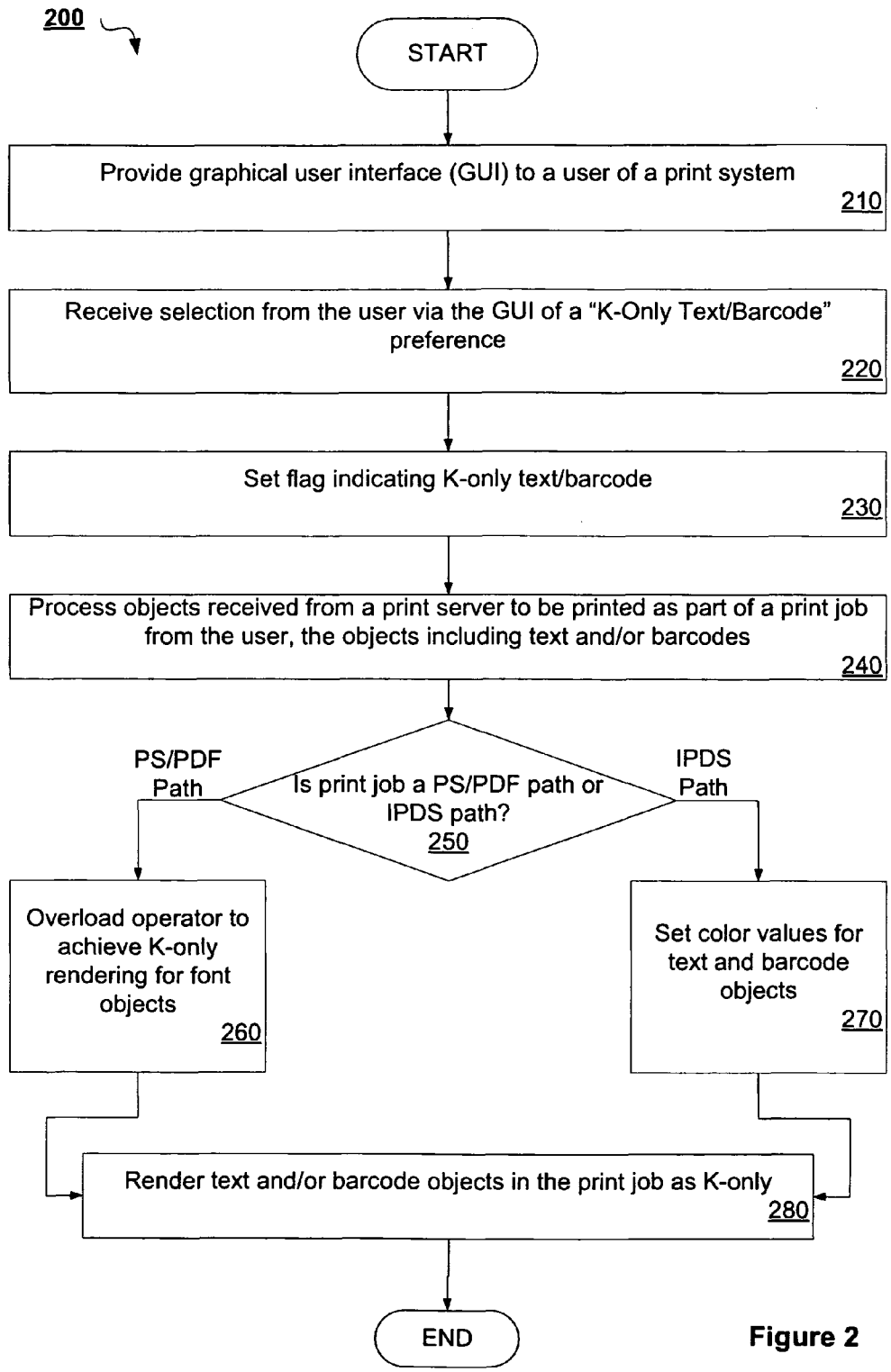
FIG. 2 is a flow diagram depicting one embodiment of a process for a system solution to enforce K-only text and barcode in color printing.

In one embodiment, printing system 100 may implement K-only text and barcode rendering in its color printing functions. FIG. 2 is a flow diagram depicting one embodiment of a process 200 for a system solution to enforce K-only gray/black text and barcode printing in a color printing system. In one embodiment, a color controller, such as control unit 130 described with respect to FIG. 1, may perform process 200.

Process 200 begins at process block 210 where the controller provides a graphical user interface (GUI) to a user of a print system. In one embodiment, the GUI may be a customized WINDOWS print driver GUI for selecting K-only text and barcode print preferences. Then, at process block 220, the controller receives a selection from the user via the GUI of a "K-only Text/Barcode" preference. In one embodiment, this preference may be a check box located on the GUI that the user may select or mark. The preference indicates the user's desire to print any text and barcode in a print job sent by the user with K-only gray or black ink/toner (hereinafter "ink"). At process block 230 the controller sets a flag in the controller code indicating the K-only text/barcode preference has been selected.

At process block 240, the controller processes objects received from a print server to be printed as part of a print job sent by the user. In one embodiment, the print server may be print server 120 described with respect to FIG. 1. The objects received from the print server may include text and barcode objects that are part of the print job sent by the user to the print system. As discussed above with respect to FIG. 1, these objects are elements normally found in presentation documents, e.g., text in typographic fonts, electronic forms, graphics, image, lines, boxes, and barcodes. As discussed previously, the AFP MO:DCA data stream is composed of architected, structured fields that describe each of these elements or objects.

At decision block 250, the controller determines whether the print job is on a PS/PDF path or an IPDS path. As described above with respect to FIG. 1, in the controller there are PS/PDF and IPDS paths. The implementations of embodiments of the invention for K-only rendering of text and barcodes in the two paths are different, as there are different controller codes associated with these two paths.

If the print job is on a PS/PDF path, then at process block 260 the controller overloads an operator in the controller code to achieve K-only rendering for font objects. This process is described in further detail below in FIG. 3. If the print job is on an IPDS path, then at process block 270 the controller sets the color values for text and barcode objects in the controller code. This process is described in further detail below in FIG. 5. Finally, at process block 280, the controller renders the text and barcode objects of the print job as K-only gray/black ink.

Figure 3:
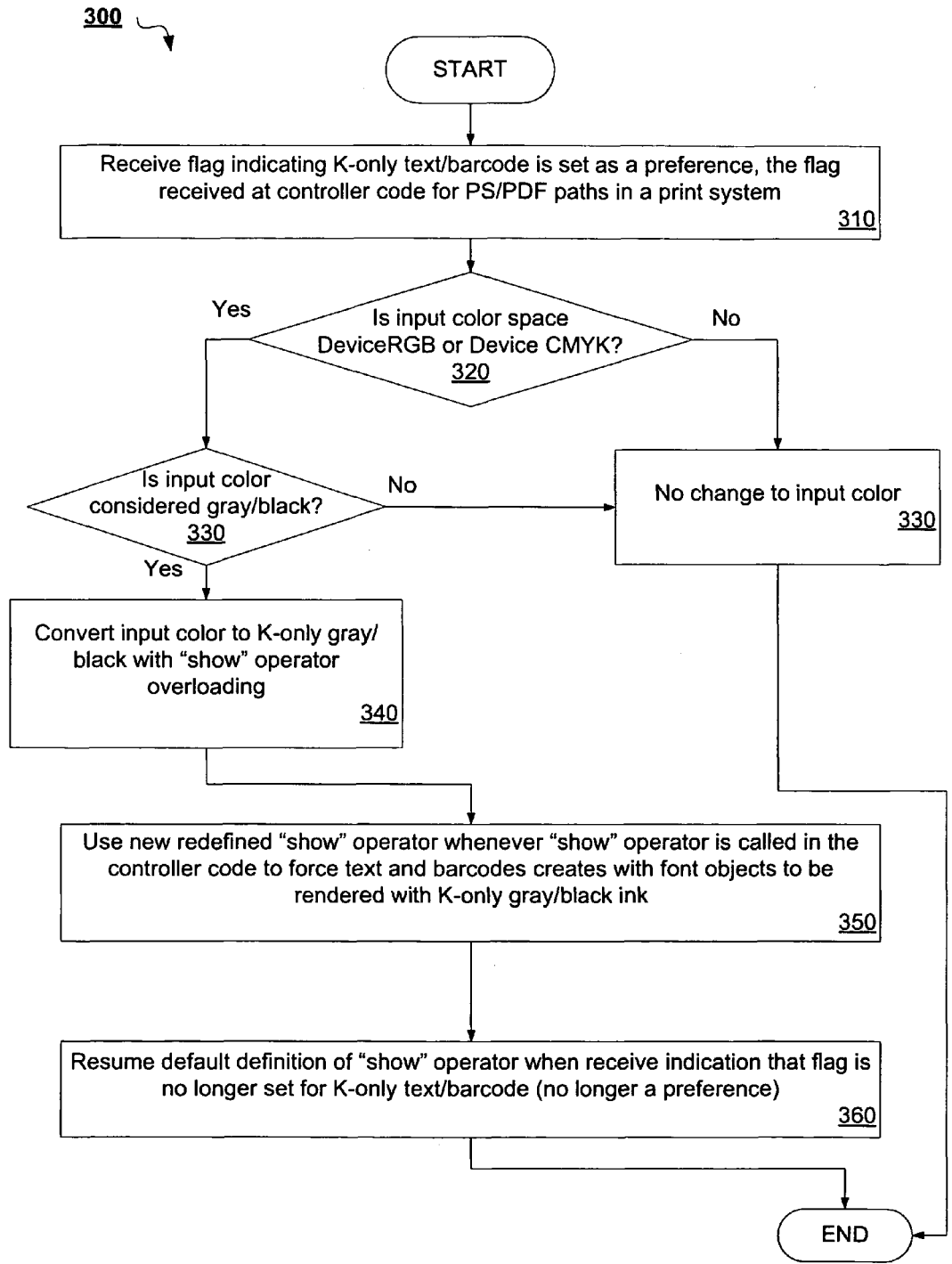
FIG. 3 is a flow diagram depicting one embodiment of a process for K-only rendering of text and barcode in a PS/PDF path of a print system.

FIG. 3 is a flow diagram depicting one embodiment of a process 300 for K-only rendering of text and barcode in a PS/PDF path of a print system. In one embodiment, process 300 depicts in more detail process block 260 described with respect to FIG. 2. As PS and PDF have very similar implementation, the following discussion utilizes PS as an example to illustrate the solution for both the PS and PDF paths.

In PS files, a barcode object does not exist. As a result, barcodes are typically designed with one of font, graphics, or image objects in PS files. Barcodes created with a font object can be redefined to force the font object to be rendered with K-only black ink according to embodiments of the invention. However, barcodes designed with graphics and image objects cannot be forced to be K-only rendered because image and graphics are typically best rendered with process CMYK for color quality. As such, embodiments of the invention provide for K-only rendering of text and barcodes in PS and PDF files solely for font objects. As described below, operator overloading is used to achieve the K-only text/barcode rendering.

Process 300 begins at process block 310 where controller code for a PS/PDF path in a print system receives a flag indicating that K-only text/barcode is set as a preference in the print system. In one embodiment, the controller code is in a control unit 130 of print system 100 described with respect to FIG. 1. Then, at decision block 320, it is determined whether the input color space for the PS path is either of a DeviceRGB or a DeviceCMYK input color space. If so, the process 300 continues to decision block 330. If the input color space is not Device RGB or Device CMYK, then there is no change to the input color on the PS path.

For instance, if the color space is DeviceGray or CIEBased, then embodiments of the invention will not make any changes to the text/barcode objects in the PS path. For the DeviceGray color space the default PS gray→CMYK conversion will take care of the text/barcode object K-only rendering. For the CIEBased color space, the color is processed through a CRD. Typically, any gray/black colors are process CMYK gray/black and not K-only gray/black.

On the other hand, at decision block 330, it is determined whether the input color (in the Device RGB or Device CMYK color space) is considered gray or black. In one embodiment, if the input color is in the DeviceRGB space, then the controller code determines the RGB input color value. Then, the controller code checks the RGB difference. If the RGB difference is very similar, then the input color is considered as gray/black. For example, the RGB difference may be determined as follows:

$r1=|1-(1-R)/(1-G)|, r2=|1-(1-B)/(1-G)|$
If r1<delta && r2<delta=0.1, then color=gray/black
Output: C=M=Y=0, K=1-(0.3R+0.59G+0.11B)

In another embodiment, if the input color is in the Device-CMYK input color space, then the controller code determined the C'M'Y'K' input color value. Subsequently, the controller code checks the C'M'Y' difference. If this C'M'Y' difference is similar, then the input color is considered as gray/black. For example, the C'M'Y' difference may be determined as follows:

$r1=|1-C'/M'|, r2=|1-Y'/M'|$
a) If r1<delta && r2<delta=0.1, the color=gray/black,
Output: C=M=Y=0, K=min(1, 0.3C'+0.59M'+0.11Y'+K')
b) If K=1, the color=black,
Output: C=M=Y=0, K=1

Then, at process block 340, the input color is converted to K-only gray/black ink (e.g., per the above definitions) by overloading a "show" operator in the controller code for PS/PDF paths. FIG. 4 depicts an exemplary redefinition of the "show" operator in controller code according to embodiments of the invention. The code 400 in FIG. 4 depicts a transformation of a color value via the "show" operator from either of the DeviceRGB color space or the Device CMYK color space. One skilled in the art will appreciate that code 400 is depicts just one exemplary way to redefine a "show" operator in controller code and that embodiments of the invention are not limited to this implementation. One skilled in the art will appreciate that code 400 may be extended to transform colors from any color space into a grayscale value and may utilize different equations to created the grayscale values.

At processing block 350, the new redefined "show" operator is used whenever the "show" operator is called in the controller code to force text and barcodes created with font objects to be rendered with K-only gray/black ink. When the redefined "show" procedure exits, the color space is set back to the original color space. Finally, at process block 360, the original or default definition of the "show" operator is resumed when the controller code receives an indication that the flag is no longer set. This indicates that the K-only text/barcode is no longer designated as a preference in the print system.

Figure 5:
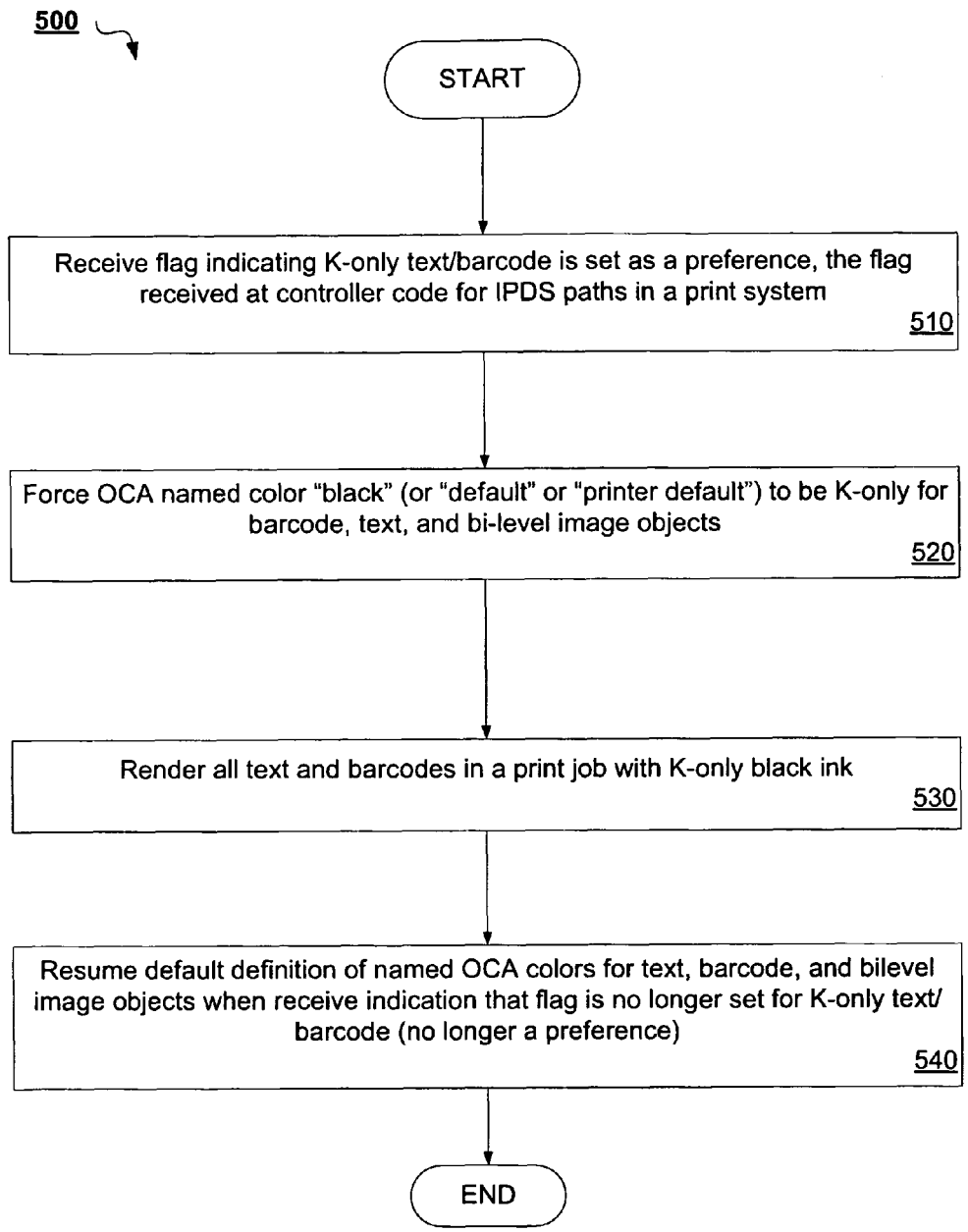
FIG. 5 is a flow diagram depicting one embodiment of a process for K-only rendering of text and barcode in an IPDS path of a print system.

FIG. 5 is a flow diagram depicting one embodiment of a process 500 for K-only rendering of text and barcode in an IPDS path of a print system. In one embodiment, process 500 depicts in more detail process block 270 described with respect to FIG. 2. Process 500 begins at process block 510 where controller code for an IPDS path in a print system receives a flag indicating that K-only text/barcode is set as a preference in the print system. In one embodiment, the controller code is in a control unit 130 of print system 100 described with respect to FIG. 1.

At process block 520, the controller code forces the Object Content Architecture (OCA)-named color 'black' to be K-only for text, barcode, and bi-level image objects. In IPDS, text objects are known as Presentation Text Object Content Architecture (PTOCA) objects, barcode objects are known as BarCode Object Content Architecture (BCOCA) objects, and bi-level images are known as Bi-level Image Object Content Architecture (bi-level IOCA) objects. PTOCA, BCOCA, and bi-level IOCA objects are a few of many objects that may be contained in MO:DCA documents, such as those described with respect to FIG. 1.

In IPDS, colors may be specified using a set of about 20 OCA-named colors. In other embodiments, colors may be specified by using CMYK, RGB, or CIELab, for example. For traditional applications of IPDS, named OCA colors are typically used. OCA-named colors are still in common use for PTOCA (text and draw-rules), BCOCA (Barcodes), and bi-level IOCA images. "Black" is one of the OCA-named color choices, as well as "Default" and "Printer Default" choices that both resolve to Black.

As part of forcing the OCA-named color "black" in process block 520, the above 3 named colors (Black, Default, Printer Default) are automatically converted directly to CMYK=00 00 00 FF (pure K) without going through a color conversion path. As a result, a print system directed to print text and/or barcodes as K-only (via a user-selected preference) may obtain this result by directing that the defined color for text, barcode, and bi-level image objects in the controller code be one of the three OCA-named colors of "black", "default", or "printer default".

At process block 530 the controller code renders all text and barcodes in a print job sent by a user of the print system with K-only black ink. Then, at process block 540, the default or original definition(s) of the OCA-named colors for text, barcode, and bi-level image objects in the controller code is resumed when the controller codes receives an indication that the flag is no longer set for the K-only text/barcode preference.

In one embodiment, similar to the PS/PDF path described with respect to FIG. 3, a more complex method for K-only rendering in the IPDS path may be used. This more complex method may include checking an input color space for text, barcode, and bi-level image objects, and converting them to grayscale color.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details.

Accordingly, the scope and spirit of the invention should be judged in terms of the claims which follow.

What is claimed is:

1. A method for providing computer services, comprising:
receiving a print job data stream including at least one of a text object and a barcode object to be printed by a print system;
determining whether the print job data stream comprises a first page description language (PDL);
converting an input color space for the at least one text object and barcode object to K-only black ink according to a first conversion process upon determining that the print job data stream comprises the first PDL;
converting the input color space for the at least one text object and barcode object to K-only black ink according to a second conversion process upon determining that the print job data stream comprises a second PDL; and
rendering the at least one of the text object and the barcode object as K-only black ink if the input color space is determined to be converted to K-only black ink.

2. The method of claim 1, further comprising setting a flag to indicate selection of a K-only text and barcode print preference from a graphical user interface (GUI).

3. The method of claim 1, wherein the first conversion process comprises overloading an operator in controller code to achieve K-only rendering for text and font objects in a first PDL path of the controller code for the print system, the overloading to redefine an operator in the controller code for the first PDL path to paint glyphs for the text and font objects with the K-only ink.

4. The method of claim 3, wherein the overloading the operator is performed when an input color space for the text and font objects in the first PDL path is at least one of a Device RGB or a Device CMYK color space and an input color space for the text and font objects in the first PDL path is at least one of a gray or black color.

5. The method of claim 3, wherein the overloading the operator is not performed when an input color space in the first PDL path is at least one of a DeviceGray color space or a CIEBased color space.

6. The method of claim 3, wherein the second conversion process comprises assigning K-only color values for text and barcode objects with an input color space of at least one of a gray or black color in a second PDL path of controller code for the print system.

7. The method of claim 6, wherein the assigning further includes forcing text, barcode, and bi-level image objects to be at least one of an object content architecture (OCA)-named color black, default, and printer default.

8. The method of claim 7, wherein the forcing includes automatically converting the OCA-named color definition for the barcode, text, and bi-level image objects directly to CMYK=00 00 00 FF.

9. The method of claim 1, further comprising rendering one or more remaining objects of the one or more objects to be printed according to a default color space assigned to the one or more remaining objects.

10. A printing system comprising:
a print server to process a print job data stream by receiving a command indicating a K-only text and barcode print preference and identifying one or more objects in the print job including at least one of a text object and a barcode object; and
a control unit communicably coupled to the print server to:
set a flag to indicate the selection of the K-only text and barcode print preference;
determine whether the print job data stream comprises a first page description language (PDL);
convert an input color space for the at least one text object and barcode object to K-only black ink according to a first conversion process upon determining that the print job data stream comprises the first PDL;
convert the input color space for the at least one text object and barcode object to K-only black ink according to a second conversion process upon determining that the print job data stream comprises a second PDL; and
render the at least one of the text object and the barcode object as K-only black ink if the input color space is determined to be converted to K-only black ink.

11. The printing system of claim 10, further comprising a print engine to print the print job with the at least one of the text and barcode objects as K-only black ink.

12. The printing system of claim 11, the first conversion process comprises overloading, based on the set flag, an operator in controller code to achieve K-only rendering for text and font objects in a first PDL path of the controller code for the print system, the overloading to redefine an operator in the controller code for the first PDL path to paint glyphs for the text and font objects with the K-only ink.

13. The printing system of claim 12, wherein the overloading the operator is performed when an input color space in the first PDL path is at least one of a Device RGB or a Device CMYK color space and an input color for the text and font objects in the first PDL path is at least one of a gray or black color.

14. The printing system of claim 13, wherein the second conversion process comprises assigning, based on the set flag, color values in the controller code for text and barcode objects with an input color space of at least one of a gray or black color to be K-only in a second PDL path of controller code and render the at least one of the text object and the barcode object as K-only gray/black ink based on the assigning.

15. The printing system of claim 14, wherein the control unit to assign the color values further includes the control unit to force text, barcode, and bi-level image objects to be at least one of an object content architecture (OCA)-named color black, default, and printer default.

16. The printing system of claim 15, wherein the control unit to force the text, barcode, and bi-level image objects further includes the control unit to automatically convert the OCA-named color definition for the barcode, text, and bi-level image objects directly to CMYK=00 00 00 FF.

17. An article of manufacture comprising a machine-readable medium including data that, when accessed by a machine, cause the machine to perform operations comprising:
receiving a print job data stream including at least one of a text object and a barcode object to be printed by a print system;
determining whether the print job data stream comprises a first page description language (PDL);
converting an input color space for the at least one text object and barcode object to K-only black ink according to a first conversion process upon determining that the print job data stream comprises the first PDL;
converting the input color space for the at least one text object and barcode object to K-only black ink according to a second conversion process upon determining that the print job data stream comprises a second PDL; and
rendering the at least one of the text object and the barcode object as K-only black ink if the input color space is determined to be converted to K-only black ink.

18. The article of manufacture of claim 17, wherein the first conversion process comprises overloading an operator in controller code to achieve K-only rendering for text and font objects in a first PDL path of the controller code for the print system, the overloading to redefine a "show" operator in the controller code for the PS/PDF first PDL path to paint glyphs for the text and font objects with the K-only ink.

19. The article of manufacture of claim 18, wherein the overloading the operator is performed when an input color space in the first PDL path is at least one of a Device RGB or a Device CMYK color space and an input color for the text and font objects in the first PDL path is at least one of a gray or black color.

20. The article of manufacture of claim 17, wherein the second conversion process comprises assigning K-only color values for text and barcode objects with an input color space of at least one of a gray or black color in an Intelligent Printer Data Stream (IPDS) path of controller code for the print system.

* * * * *

UNITED STATES PATENT AND TRADEMARK OFFICE
CERTIFICATE OF CORRECTION

PATENT NO.       : 9,258,455 B2
APPLICATION NO.  : 12/151803
DATED            : February 9, 2016
INVENTOR(S)      : Li et al.

It is certified that error appears in the above-identified patent and that said Letters Patent is hereby corrected as shown below:

In the Claims

In column 9 at line 6 delete, "controller code for the PS/PDF first PDL path to paint glyphs", and insert -- controller code for the first PDL path to paint glyphs --.

Signed and Sealed this
Fourteenth Day of June, 2016

Michelle K. Lee
*Director of the United States Patent and Trademark Office*